(12) United States Patent
DeHon et al.

(10) Patent No.: US 11,232,208 B2
(45) Date of Patent: Jan. 25, 2022

(54) METHODS, SYSTEMS, AND COMPUTER READABLE MEDIA FOR ADAPTIVE METADATA ARCHITECTURE

(71) Applicant: The Trustees of the University of Pennsylvania, Philadelphia, PA (US)

(72) Inventors: Andre DeHon, Philadelphia, PA (US); Udit Dhawan, New Delhi (IN); Nicholas Edward Roessler, Philadelphia, PA (US)

(73) Assignee: THE TRUSTEES OF THE UNIVERSITY OF PENNSYLVANIA, Philadelphia, PA (US)

( * ) Notice: Subject to any disclaimer, the term of this patent is extended or adjusted under 35 U.S.C. 154(b) by 101 days.

(21) Appl. No.: 16/802,216

(22) Filed: Feb. 26, 2020

(65) Prior Publication Data

US 2020/0272736 A1 Aug. 27, 2020

Related U.S. Application Data

(60) Provisional application No. 62/810,925, filed on Feb. 26, 2019.

(51) Int. Cl.
*H04L 9/00* (2006.01)
*G06F 21/57* (2013.01)
*H03M 7/40* (2006.01)

(52) U.S. Cl.
CPC .............. *G06F 21/57* (2013.01); *H03M 7/40* (2013.01); *G06F 2221/034* (2013.01)

(58) Field of Classification Search
CPC .... G06F 21/57; G06F 2221/034; G06F 21/50; G06F 21/78; H03M 7/40; H03M 7/4043
See application file for complete search history.

(56) References Cited

U.S. PATENT DOCUMENTS

| | | | |
|---|---|---|---|
| 9,183,320 B2 * | 11/2015 | Ono | G06F 16/81 |
| 9,785,440 B2 | 10/2017 | DeHon | |
| 10,078,763 B2 | 9/2018 | Chiricescu et al. | |
| 10,235,176 B2 | 3/2019 | DeHon et al. | |
| 10,261,794 B2 | 4/2019 | DeHon | |
| 10,521,230 B2 | 12/2019 | DeHon | |
| 10,545,760 B2 | 1/2020 | DeHon | |
| 10,642,616 B2 | 5/2020 | DeHon et al. | |

(Continued)

OTHER PUBLICATIONS

Prakash, "The Holy Grail—Real Time Memory Access Checking," Oracle All in a day's work Blog, pp. 1-5 (Oct. 15, 2015).

(Continued)

*Primary Examiner* — Beemnet W Dada
(74) *Attorney, Agent, or Firm* — Jenkins, Wilson, Taylor & Hunt, P.A.

(57) ABSTRACT

Methods, systems, and computer readable media for using variable metadata tags. A method occurs at a metadata processing system for enforcing security policies in a processor architecture. The method comprises: receiving, at the metadata processing system, a tag associated with a word in memory, wherein the tag indicates a memory location containing metadata associated with the word and wherein the tag length is at least in part determined using tag usage frequency; obtaining the metadata from the memory location, and determining, using the metadata, whether the word or a related instruction violates a security policy.

19 Claims, 7 Drawing Sheets

(56) References Cited

U.S. PATENT DOCUMENTS

| | | | |
|---|---|---|---|
| 10,719,630 | B2 | 7/2020 | Chiricescu et al. |
| 10,725,778 | B2 | 7/2020 | DeHon et al. |
| 2014/0040698 | A1* | 2/2014 | Loh .................. G06F 11/1004 714/758 |
| 2014/0281550 | A1* | 9/2014 | Resch .............. G06F 21/6218 713/171 |
| 2018/0336033 | A1 | 11/2018 | DeHon et al. |
| 2019/0034665 | A1 | 1/2019 | Chiricescu et al. |
| 2019/0243655 | A1 | 8/2019 | Milburn et al. |
| 2020/0050703 | A1* | 2/2020 | Purushothaman ...... G06F 40/30 |
| 2020/0089500 | A1 | 3/2020 | DeHon |
| 2020/0133544 | A1* | 4/2020 | Slater ................. G06F 11/1453 |
| 2020/0174966 | A1* | 6/2020 | Szczepanik ........... G06F 16/116 |
| 2020/0387374 | A1 | 12/2020 | DeHon |
| 2021/0004231 | A1 | 1/2021 | DeHon |
| 2021/0026934 | A1 | 1/2021 | Boling et al. |
| 2021/0055954 | A1 | 2/2021 | Milburn et al. |
| 2021/0073375 | A1 | 3/2021 | Milburn et al. |

OTHER PUBLICATIONS

Heo et al., "Implementing an Application-Specific Instruction-Set Processor for System-Level Dynamic Program Analysis Engines," ACM Transactions on Design Automation of Electronic Systems, vol. 20, No. 4, Article 53, pp. 1-32 (Sep. 2015).

Dhawan et al., "Architectural Support for Software-Defined Metadata Processing," ASPLOS 2015, pp. 487-502 (Mar. 14-18, 2015).

Davi et al., "Stitching the Gadgets: On the Ineffectiveness of Coarse-Grained Control-Flow Integrity Protection," Proceedings of the 23rd USENIX Security Symposium, pp. 1-17 (Aug. 20-22, 2014).

Fytraki et al., "FADE: A Programmable Filtering Accelerator for Instruction-Grain Monitoring," In Proceedings of the 20th International Symposium on High Performance Computer Architecture (HPCA 2014), pp. 1-12 (2014).

Göktaş et al., "Out Of Control: Overcoming Control-Flow Integrity," IEEE Symposium on Security and Privacy, pp. 1-15(2014).

Nagarakatte et al., "Hardware-Enforced Comprehensive Memory Safety," IEEE Computer Society, pp. 38-47 (2013).

Zhang et al., "Practical Control Flow Integrity & Randomization for Binary Executables," 2013 IEEE Symposium on Security and Privacy, pp. 559-573 (2013).

Chen et al., "A Software-Hardware Architecture for Self-Protecting Data," CCS '12, pp. 1-14 (Oct. 16-18, 2012).

Ganesh, "Pointer Checker: Easily Catch Out-of-Bounds Memory Accesses," The Parallel Universe, pp. 1-16 (2012).

Kang et al., "DTA++: Dynamic Taint Analysis with Targeted Control-Flow Propagation," Network and Distributed System Security Symposium (NDSS), pp. 1-14 (2011).

Abadi et al., "Control-Flow Integrity Principles, Implementations, and Applications," ACM Transactions on Information and System Security, vol. 13, No. 1, Article 4, pp. 1-40 (Oct. 2009).

Akritidis et al., "Baggy Bounds Checking: An Efficient and Backwards-Compatible Defense against Out-of_Bounds Errors," Proceedings of the 18th Conference on USENIX Security Symposium, pp. 1-16 (2009).

Nagarakatte et al., "SoftBound: Highly Compatible and Complete Spatial Memory Safety for C," PLDI '09, pp. 245-258 (Jun. 15-20, 2009).

Chen et al., "Flexible Hardware Acceleration for Instruction-Grain Program Monitoring," 35th International Symposium on Computer Architecture (ISCA), pp. 1-12 (2008).

Clause et al., "Effective Memory Protection Using Dynamic Tainting," ASE'07, pp. 283-292 (Nov. 5-9, 2007).

Clause et al., "Dytan: A Generic Dynamic Taint Analysis Framework," ISSTA '07, pp. 1-11 (Jul. 9-12, 2007).

Arora et al., "Architectural Support for Run-Time Validation of Program Data Properties," IEEE Transactions on Very Large Scale Integration (VLSI) Systems, vol. 15, pp. 546-559 (May 2007).

Venkataraman et al., "MemTracker: Efficient and Programmable Support for Memory Access Monitoring and Debugging," Proceedings of the 13th International Symposium on High-Performance Computer Architecture *HPCA-13), pp. 1-12 (Feb. 2007).

Crandall et al., "Minos: Architectural Support for Protecting Control Data," ACM Transactions on Architecture and Code Optimization, vol. 3, No. 4, pp. 359-389 (Dec. 2006).

Abadi et al., "Control-Flow Integrity," CCS'05, pp. 340-353 (Nov. 7-11, 2005).

Chen et al., "Defeating Memory Corruption Attacks via Pointer Taintedness Detection," International Conference on Dependable Systems and Networks (DSN), pp. 1-10 (2005).

Suh et al., "Secure Program Execution via Dynamic Information Flow Tracking," ASPLOS '04, pp. 85-96 (Oct. 9-13, 2004).

Vachharajani et al., "RIFLE: An Architectural Framework for User-Centric Information-Flow Security," Proceedings of the 37th International Symposium on Microarchitecture, pp. 1-12 (2004).

Carter et al., "Hardware Support for Fast Capability-based Addressing," Association of Computing Machinery, pp. 319-327 (1994).

Wahbe et al., "Efficient Software-Based Fault Isolation," Proceedings of the Symposium on Operating System Principles, pp. 1-14 (1993).

Huffman, "A Method for the Construction of Minimum-Redundancy Codes," Proceedings of the I.R.E., pp. 1098-1101 (Sep. 1952).

Commonly-Assigned, co-pending U.S. Appl. No. 17/188,547 for "Methods, Systems, and Computer Readable Media for Main-Memory Tag Compression," (Unpublished, filed Mar. 1, 2021).

Sullivan et al., "The Dover Inherently Secure Processor," IEEE, pp. 1-5 (2017).

\* cited by examiner

| Unit | Design | Organization | Area (mm²) | Access Energy R/W (pJ) | Static Power (pJ/cyc) | Latency (ps) | Cyc |
|---|---|---|---|---|---|---|---|
| Register File (Int. and FP) | Baseline | 64b, 2R1W, [32 Integer, 32 Floating] | 0.003 | 1.5/1.5 | 0.0 | 490 | 1 |
| | 10b-tag | 74b, 2R1W, [48 Integer, 32 Floating] | 0.004 | 2.0/2.1 | 0.0 | 530 | 1 |
| | 12b-tag | 76b, 2R1W, [48 Integer, 32 Floating] | 0.005 | 2.0/2.2 | 0.0 | 530 | 1 |
| L1-$ (I and D) | Baseline | 64KB, 4-way, 64B/line | 0.082 | 12.0/9.7 | 0.04 | 900 | 1 |
| | 10b-tag | 74KB, 4-way, 74B/line (eff. 64KB, 64B/line) | 0.108 | 16.6/15.1 | 0.05 | 940 | 1 |
| | 12b-tag | 76KB, 4-way, 76B/line (eff. 64KB, 64B/line) | 0.109 | 17.0/15.5 | 0.05 | 940 | 1 |
| L2-$ | Baseline | 512KB, 8-way, 64B/line | 0.596 | 22.9/28.0 | 0.37 | 2510 | 1 |
| | 14b-tag | 624KB, 8-way, 78B/line (eff. 512KB, 64B/line) | 0.71 | 30.2/35.8 | 0.45 | 2600 | 1 |
| | 15b-tag | 632KB, 8-way, 79B/line (eff. 512KB, 64B/line) | 0.709 | 30.6/36.1 | 0.45 | 2580 | 1 |
| TLB | – | 1KB, 2-way set-assoc. | 0.013 | 1.4/3.5 | 0.01 | 910 | 1 |
| DRAM | Baseline | 1GB, access 64B line per transfer | | 15,000 | | | 100 |
| | 64b-tag | 1GB, access 128B line (move 76B) | | 17,500 | | | 112 |
| | 64b-tag | 1GB, access 128B line (move 66B) | | 15,200 | | | 101 |
| Opcode | | 512×16 SRAM | 0.001 | 0.0 | 0.0 | 540 | 1 |
| full→L2-tag | 64b→14b | 8196-entry, 64b match, 14b out dMHC(4,2) | 0.386 | 17.1/80.6 | 0.2 | 2310 | 3 |
| | 64b→15b | 8196-entry, 64b match, 15b out dMHC(4,2) | 0.388 | 17.3/81.0 | 0.2 | 2310 | 3 |
| L2-tag→full | 14b→64b | 16K×64 SRAM | 0.141 | 9.3/12.1 | 0.09 | 1570 | 2 |
| | 15b→64b | 32K×64 SRAM | 0.261 | 14.7/15.6 | 0.17 | 1680 | 2 |
| L2-tag→L1-tag | 14b→10b | 16K×10 SRAM | 0.023 | 1.4/1.3 | 0.02 | 940 | 2 |
| | 15b→11b | 32K×11 SRAM | 0.051 | 2.2/2.1 | 0.03 | 1070 | 2 |
| L1-tag→L2-tag | 10b→14b | 1K×14 SRAM | 0.002 | 0.4/0.4 | 0.0 | 560 | 1 |
| | 11b→15b | 1K×14 SRAM | 0.004 | 0.6/0.6 | 0.0 | 680 | 1 |
| UCP-$ | 64b tags | 2048-entry, 328b match, 128b out 2-level dMHC(4,2) | 0.238 | 23.1/73.7 | 0.11 | 1790 | 2 |
| CTAG-$ | 64b tags | 512-entry 2-level dMHC(4,2) | 0.047 | 10.6/38.9 | 0.02 | 1440 | 2 |
| L1 PUMP-$ | 10b L1 tag | 1024-entry, 58b match, 20b out Fast-Value dMHC(4,2) | 0.101 | 6.5/30.1 | 0.06 | 670 | 1 |
| | 12b L1 tag | 1024-entry, 68b match, 24b out +11b counter | 0.117 | 8.6/24.1 | 0.06 | 730 | 1 |
| | 2–8b tag | Fast-Value dMHC(4,2) | 0.103 | Tab. 1, 2 | 0.05 | <760 | 1 |
| L2 PUMP-$ | 14b L2 tag | 4096-entry, 78b match, 28b out 2-level dMHC(4,2) | 0.186 | 11.0/47.7 | 0.11 | 1780 | 2 |
| | 15b L2 tag | 4096-entry, 83b match, 30b out +11b counter | 0.201 | 12.4/50.4 | 0.12 | 1810 | 2 |
| Watch Table | 64b-tag | 512-entry 2-level dMHC(4,2), 24b counter | 0.018 | 3.4/13.9 | 0.01 | 1230 | 2 |

FIG. 6

METHODS, SYSTEMS, AND COMPUTER READABLE MEDIA FOR ADAPTIVE METADATA ARCHITECTURE

PRIORITY CLAIM

This application claims the benefit of U.S. Provisional Patent Application Ser. No. 62/810,925, filed Feb. 26, 2019; the disclosure of which is incorporated herein by reference in its entirety.

GOVERNMENT INTEREST

This invention was made with government support under Grant No. 1513854 awarded by the CNS division of the National Science Foundation and a DARPA contract FA8650-10-c-7090 awarded by DARPA. The government has certain rights in the invention.

TECHNICAL FIELD

This specification relates generally to metadata processing systems for processor architectures. More specifically, the subject matter relates to methods, systems, and computer readable media for adaptive metadata architecture.

BACKGROUND

Today's computer systems are notoriously hard to secure, and conventional processor architectures are partly to blame, admitting behaviors (pointer forging, buffer overflows, etc.) that blatantly violate higher-level abstractions. The burden of closing the gap between programming language and hardware is left to software, where the cost of enforcing airtight abstractions is often deemed too high.

Recently, some systems have demonstrated the value of propagating metadata during execution to enforce policies that catch safety violations and malicious attacks as they occur. These policies can be enforced in software, but typically with high overheads that discourage their deployment or motivate coarse approximations providing less protection. Hardware support for fixed policies can often reduce the overhead to acceptable levels and prevent a large fraction of today's attacks. However, attacks rapidly evolve to exploit any remaining forms of vulnerability.

One flexible security architecture for resolving some of these issues may include a programmable unit for metadata processing (PUMP) system. A PUMP system may indivisibly associate a metadata tag with every word in the system's main memory, caches, and registers. To support unbounded metadata, the tag may be large enough to point or indirect to a data structure in memory. On every instruction, the tags of the inputs can be used to determine if the operation is allowed, and if so to determine the tags for the results. The tag checking and propagation rules can be defined in software; however, to minimize performance impact, these rules may be cached in a hardware structure, the PUMP rule cache, that operates in parallel with the arithmetic logic unit (ALU). A software miss handler may service cache misses based on the policy rule set currently in effect.

However, a simple, direct implementation of a PUMP system is rather expensive. For example, adding pointer-sized (64-bit) tags to 64-bit words at least doubles the size and energy usage of all the memories in the system; rule caches add area and energy on top of this resource requirement.

SUMMARY

This specification describes methods, systems, and computer readable media for adaptive metadata architecture. A method for using variable metadata tags occurs at a metadata processing system for enforcing security policies in a processor architecture. The method comprises: receiving, at the metadata processing system, a tag associated with a word in memory, wherein the tag indicates a memory location containing metadata associated with the word and wherein the tag length is at least in part determined using tag usage frequency; obtaining the metadata from the memory location, and determining, using the metadata, whether the instruction violates a security policy.

The subject matter described herein may be implemented in hardware, software, firmware, or any combination thereof. As such, the terms "function" or "node" as used herein refer to hardware, which may also include software and/or firmware components, for implementing the feature(s) being described. In some exemplary implementations, the subject matter described herein may be implemented using a computer readable medium having stored thereon computer executable instructions that when executed by the processor of a computer control the computer to perform steps. Exemplary computer readable media suitable for implementing the subject matter described herein include non-transitory computer readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

Embodiments of the subject matter described herein will now be explained with reference to the accompanying drawing, wherein like reference numerals represent like parts, of which:

FIG. 2 shows a table illustrating policies and characteristics associated with different metadata tag usage;

FIG. 6 shows some memory resource estimations for various implementations on a 22-nanometer node.

DETAILED DESCRIPTION

Figure 1:
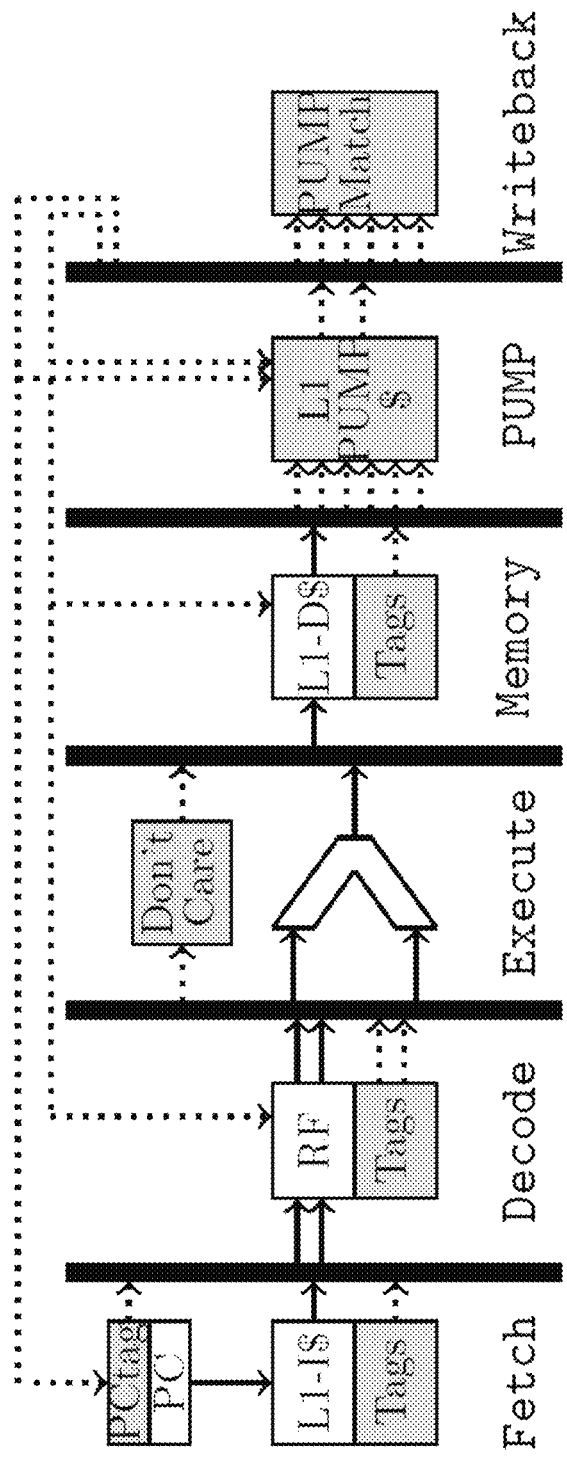
FIG. 1 is a diagram illustrating an example programmable unit for metadata processing (PUMP) rule cache in a processor pipeline.

This specification relates to methods, systems, and computer readable media for using adaptive metadata architecture. Over the last decade, a growing body of work has demonstrated the benefits of attaching metadata to the values carried through a computation at runtime and using that metadata to enforce safety and security policies [1, 2, 3, 4, 5, 6]. Initial, modest versions used a single bit of data to track the flow of untrusted, external inputs [7] and uninitialized or unallocated memory locations [8]. More recently, more sophisticated versions use more data to track call and return sites [9] and full memory safety [10, 11, 12, 13]. This has prompted clever solutions that show powerful protections possible with just a few bits of metadata [14, 15], as well as, demonstrations that these limited schemes provide less protection than the richer versions they approximate [16, 17]. Recent work shows how hardware acceleration can support rich, unbounded programmable metadata processing [18, 19, 20], perhaps at the cost of carrying large (e.g., 64b) metadata tags throughout the computation.

In an era with heightened demand for both low-energy computation and increased safety and security of our computation, this creates a quandary. Using little or no metadata keeps energy usage low, but forgoes hardware support for safety and security. Safety and security can be optionally enforced in software when needed, but with high runtime, and, consequently, energy, overhead (e.g., 67% runtime overhead for softbound [21]). Hardware support for large metadata allows rich policies, strong abstraction, and hardware acceleration, but imposes an energy cost on all programs, even those that do not use the rich metadata tagging features or could have been adequately protected with a more modest scheme. Can we build an architecture that supports energy-proportional, software-defined metadata processing, such that we spend just as much energy as needed to protect the application? Policy costs are driven by the width of the tags, the number of tag inputs and outputs, and the number of rules required to support them. These effectively drive the size of the memories that hold metadata-extended values. Since larger memories, with more content and more output bits, require more energy per operation, the number and width of tags and the number of rules drives the energy demands for a policy. Short tags with few rules could be accommodated with a small memory that adds little energy. Long tags with many rules demand a large, energy expensive memory.

The trick then is to use as small a memory as possible for a given policy. The first step might be to only use $\log_2$ (|Tags|) bits and small memories that just hold the number of required rules. However, we can go further by noticing that (a) not all tags are used with equal frequency, (b) not all rules are used with equal frequency, and (c) the frequency of tag and rule uses changes over time throughout the execution of a program. Consequently, if we can support variable-width tags that are encoded adaptively based on their usage, we can compress the average tag length close to the entropy level, or information content, of the tag. Furthermore, if we provide a variety of rule caches that accommodate tags of different lengths, we can spend energy checking and computing tags that is proportional to their complexity and usage. The most commonly used tags and rules can be resolved in the smallest and hence least energy expensive rule caches. This allows us to spend energy proportional to the complexity of the policy in use.

To support this adaptive tag compression scheme, we must collect statistics on rule usage during runtime. A naive version would demand that we collect usage counts on every rule and perform periodic encoding over millions of tags. However, we observe that most of the gains can be obtained by only encoding the most frequently used 100-1000 tags. Consequently, we introduce a lightweight tracking scheme that attempts to identify only the top 100-1000 tags and give them short, variable length codes, allowing the remaining tags to be uniformly encoded.

As a result, we see that even sophisticated, composite policies that require millions of tags and rules have an average used tag length of 2-4 bits. This reduces the energy overhead for these rich policies from 60% to 20%. Trivial policies can be implemented with 5% overhead, while very fine-grained policies with tens of millions of tags can be supported, driving the energy overhead up to 80%.

Our contributions include:
- A strategy for encoding and exploiting variable-length tags in the most heavily used cache-level
- An efficient, lightweight approximation scheme that collects data on tag usage to adaptively re-encode tags during execution
- Selective-field activation to use energy proportional to tag field usage
- Characterization of policy complexity by tags and rules, showing range of potential policies
- Characterization of the energy and runtime costs in relation to policy complexity 2. Architecture Informally, our machine model allows the definition and acceleration of arbitrary metadata processing. We first define the conceptual Software Defined Metadata Processing (SDMP) model, then how it can be implemented, and introduce a standard form for abstractly specifying the policies allowed by this model.

In one example SDMP model, every machine word in the address space of the computation is atomically linked to an associated piece of metadata. As part of the atomic execution of every machine-level instruction, the machine also performs a calculation based on the metadata of the inputs to the instruction to determine if the instruction is valid and what the metadata on the results of the instruction should be. The metadata inputs to an instruction include the metadata on the instruction word itself (CI), the metadata on the program counter (PC), the metadata on the operands to the instruction (OP1, OP2), and the metadata on the memory location being read or written (MR). The metadata output includes the metadata on the result, either a value written to a register or a memory location (R') and the metadata on the program counter (PC). The mapping from metadata inputs to instruction validation and metadata outputs is defined by software and can be any proper function from the provided inputs, including the opcode of the instruction, to the outputs.

A correct, but inefficient, implementation of the SDMP model would run the software metadata mapping function before allowing each instruction to commit. However, since the software metadata mapping function can require tens to thousands of instructions to execute depending on the complexity of software policy, this would add orders of magnitude runtime and energy overhead to program execution.

Nonetheless, this overhead can largely be avoided using suitable metadata encoding and caching. In particular, one example implementation of a more efficient SDMP model represents the metadata with a 64-bit (64b) tag on a 64b word and caches the mapping from the opcode and the five metadata inputs to the two metadata outputs. The 64b tag supports unbounded metadata by serving as a pointer to an immutable data structure representing the metadata for a machine word.

FIG. 1 is a diagram illustrating an example programmable unit for metadata processing (PUMP) rule cache in a processor pipeline. For a suitable small cache, cached mapping between the opcode and metadata and the metadata outputs can be implemented in a single machine cycle as a separate stage in the processor pipeline, so that it adds no additional runtime cycles in the common case of a cache hit (see FIG. 1). Each mapping from a unique opcode and concrete tags for metadata input set to an output is a concrete rule. For example, a type checking rule that checked that said the sum of two integers (INT) is an integer and also checked that the current instruction was tagged as an instruction (INSTR) might look like:

add: (DEFAULT, INSTR, INT, INT, DEFAULT))→(DEFAULT, INT)

Here, the PC tag has a default value (DEFAULT) and the add operation does not get a tag from memory. The cache on concrete rules is a PUMP (Programmable Unit for Metadata Processing) system. This concrete implementation benefits from the fact that, when properly canonicalized, the number of unique metadata descriptions, and hence concrete $64b$ tags, is small and the locality of tags is high enough that the working set required for rules is also small. A key issue defining the complexity of supporting a particular safety or security policy, or combination thereof, is the number of unique tags and rules.

The concrete implementation can be further optimized by exploiting a number of common properties in the rules. To reduce the number of concrete rules, and hence reduce the pressure on the small PUMP cache, we can group together opcodes which are treated identically by the metadata policy into opgroups. Also to reduce the number of concrete rules, based on the opgroups, we use a care vector to mask out unused inputs to a concrete rule before performing the cache lookup in the PUMP. To reduce the size and complexity of the most commonly used instruction and data caches, as well as the PUMP caches, efficient implementations translate full, 64b tags, to shorter tags for use in the levels of the memory system closest to the processor. To reduce the cost of transferring tags from main memory, implementations can exploit spatial locality in tags to only transfer the unique tags in each cache line and their mapping to words in the cache line. To efficiently support powerful policies that can be described as a composition of more basic policies, the microarchitecture may include caches on the component policies.

A compact way to define SDMP policies is to express rules in terms of symbolic variables. These symbolic rules provide roughly the same mapping as the concrete rules, and are of the form:

opgroup:(PC, CI, $OP_1$, $OP_2$, MR)→(PC', R') if guard?

Symbolic rules differ from concrete rules in that they can use abstract data structures for the metadata and can be written in terms of relationships between the symbolic metadata in the inputs and outputs of the symbolic rules. A small number of symbolic rules can define the behavior of a policy over an unbounded number of concrete tags. We might generalize the above typing rule to work for any 2-input arithmetic operation (e.g., add, subtract, multiply, xor) and say that any input type (type) produced an output of the same type.

ar2s1d:(–, INSTR, type, type, –)→(–, type)

For this operation, we leave the PC unchanged and ignore the non-present memory input, so mark them as don't cares.

3. Policies

The SDMP model allows us to define a large range of safety and security policies of varying complexity. In this section, we define a set of illustrative policies and characterize their complexity along several axes.

Taint Tracking.

Modern tag protection started with a single bit tag to differentiate untrusted data (e.g., data entering the program from the network or a file) from trusted data (e.g., data and instructions that are part of the program executable) [7]. The simple policy would mark all data coming directly from some input stream as untrusted. Then, as instructions compute on these inputs, all outputs derived from untrusted sources are also marked untrusted using rules like:

ar2s1d:(–, TRUSTED, $op_1$, $op_2$, –)→(–, min($op_1$, $op_2$))

Which says that any of the 2-operand arithmetic instructions produce a trusted output, only when both operands are trusted (taking UNTRUSTED<TRUSTED). Furthermore, the operation is only allowed if the instruction itself remains trusted, preventing the processor from executing data that comes from an input stream as code.

As more bits become available to express policies, we can extend this simple taint tracking to distinguish sources. For input streams, we can assign a unique tag to each stream so we can identify the sources that contribute to each output. The metadata tag on tainted data can now be extended to a set to represent the contributing sources, and the rule extended to compute the set union:

$$ar2s1d:(-,-,op_1,op_2,-)\rightarrow(-,op_1\cup op_2) \quad (1)$$

We can also add unique tags to portions of the code and taint outputs based on the code that participated in its production:

$$ar2s1d:(-,ci,op_1,op_2,-)\rightarrow(-,ci\cup op_1\cup op_2) \quad (2)$$

This allows us to place constraints on the interaction and flow of modules. For example, we might taint code in a less trusted library module (e.g., a jpeg rendering engine) and not allow any data tainted by this isolated module to be used in operations on a password or address book database.

The number of tag bits we need to identify initial sources will depend on the granularity at which we choose to tag the sources. For code we will explore tagging code by libraries, by their source file, and by individual functions. For input streams, we tag each file or network stream open uniquely. Since taints become sets of tags, the total number of tags could become the power set of the initial tags.

Figure 2:
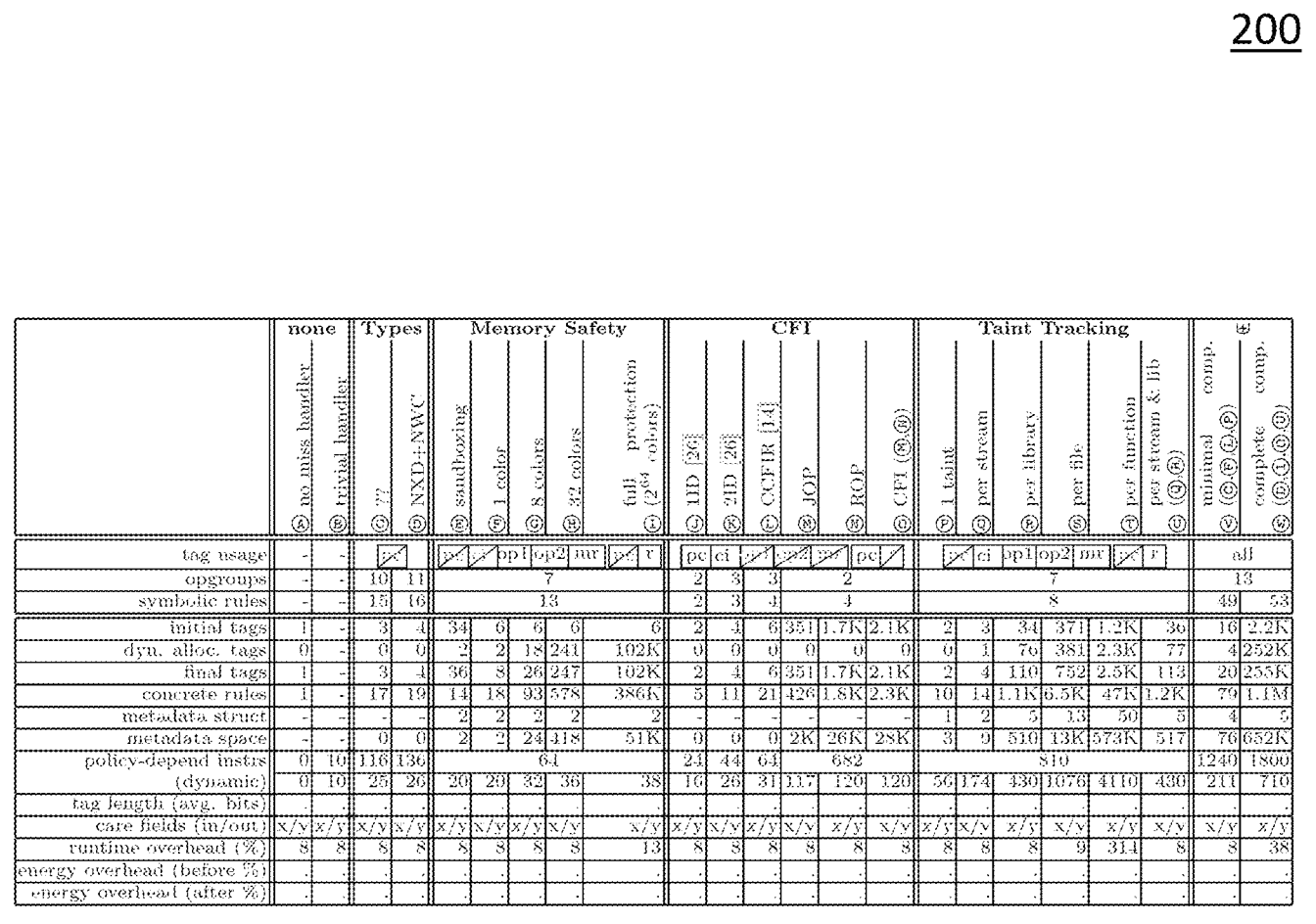

This creates a range of taint tracking policies from the simple 1b (two tag) trusted/untrusted policy to rich policies with thousands of tags requiring at least 12b of tag (see FIG. 2).

Memory Safety.

The simplest memory safety policies use a single tag bit to differentiate allocated and unallocated memory addresses on the heap [8, 22, 23]. For complete heap memory safety, a unique tag is allocated for every malloc, and the memory operation is only allowed if the tag of the allocation matches the tag of the pointer. This demands the potential to support an unlimited number of tags or, at least, a number of tags comparable to the number of words in the address space of the machine. Between these extremes, a limited number of tag bits can be used by allocating memory block tags, colors, modulo the total number of memory colors [24, 15]. While not providing complete memory safety, the limited color schemes make it less and less likely that an out-of-bound pointer can accidently be used to reference a different block. Another intermediate case provides fault isolation by allocating different tags for independent memory allocation pools [25].

Control Flow Integrity.

Simple control flow integrity (CFI) policies use just a few tags to identify valid function entry and return points to limit opportunities for return- and jump-oriented programming [26, 14]. However, these simple policies have been shown to still be vulnerable to attack [16, 17]. More complete policies [26] tag each function entry, return, and return point uniquely and include rules to limit transfers according to those allowed by the original program control flow graph. In addition to a complete CFI, we break out a set of rules that protect indirect jumps and calls (JOP) and returns (ROP).

Types.

To protect against simple code injection attacks, we can tag code separately from data to enforce a Non-Executable Data and Non-Writable Code (NXD+NWC) policy.

Composite Policies.

It would be unfortunate if we had to choose between a memory protection policy and a CFI policy. With SDMP there is no need to make this selection, as we can simultaneously support any number of policies. Exploiting the fact that the tags can serve as pointers, the tag pointer can point to a tuple containing metadata component tags for each of the policies. The policy function in software can destructure the composite metadata structure, resolve each policy independently, and create a composite policy tag for the result. For simple composites, the components are treated orthogonally, with the operation allowed only when all policies agree that the operation is allowed. Using the policies described so far, a write operation that occurred at a return entry point would only be allowed if the control transfer was from a valid return point, the instruction was suitably tagged as executable, the write pointer was not tainted as coming from certain libraries, the write pointer matched the memory cell addressed and was not tagged as non-writable. The resulting memory cell might be updated with the taint carried by the data, the instruction, the pointer used for the write, and the existing taint on the memory cell. We can create a range of composite policies with varying sophistication by selecting from the range of component policies (e.g., how many colors to use for memory-safety policy, which CFI, what granularity of taint tracking?).

The tag space for the composite policies are potentially the product set of each of the component policies. Since the memory safety and taint-tracking policies already require a potentially unbounded number of tags the composite policy is unbounded as well. In practice, the number tags needed grows even further, up into the millions of tags, demanding 20+ bits to represent the tags.

No Policy.

At the opposite extreme, we could install no policy. There is a single tag, a single opgroup, one rule that allows inputs with this single tag on the opgroup and produces the single tag as a result. This policy requires no tag bits.

Policy Characterization.

The previous discussion has shown how we can vary the level of protection provided by policies by selecting the number of tags used, the richness of the metadata structures, the rules supported, and the number of policies supported simultaneously.

FIG. 2 shows a table 200 illustrating policies and characteristics associated with different metadata tag usage. To begin to understand the varying complexities of these policies, we measure a number of characteristics including the runtime and energy overhead (see FIG. 2). Tag usage shows which tags are not used by any of the rules in the policy. Opgroups is the minimum number of opgroups needed to capture the policy; the fewer opgroups we use, the greater compression we get for concrete rules and hence the greater is the effective PUMP capacity. Symbolic rules is the number of symbolic rules we wrote to express the policy. Initial tags is the number of tags in the initial memory image before execution begins. During execution more tags will be dynamically allocated (dyn. alloc. tags). Furthermore, policies like taint tracking will create tags to represent unions of sets of taints, and composite policies will form tuples of individual policy tags. Final tags identify the number of tags that exist at the end of a one billion instruction simulation period; this gives some sense of policy complexity and can be used to infer the rate of tag creation. Concrete rules, the number of unique concrete rules generated during the simulation period, characterizes the number of compulsory misses needed to resolve symbolic rules to concrete rules and, effectively, the compulsory miss rate. Metadata struct, the average size in words of the data structure pointed to by each tag, illustrates the value of having unbounded metadata. Metadata space, the number of words required for all of the data structures holding policy-related information to which the metadata tags point, characterizes the memory overhead beyond the tags themselves. Policy-depend instrs is the total number of instructions required for the code that resolves symbolic rules to concrete ones; this is useful in understanding the complexity of the policy. Policy-depend instrs (dynamic) is the average number of policy-dependent instructions executed to resolve from a symbolic rule to a concrete rule; this is indicative of the runtime complexity of the miss handler for each of the policies. The impact of the policy-dependent portion depends on the complexity of the rules, the metadata data structures, the locality of the metadata data structures, and the need to allocate new result tags. The policy-independent part of the miss handler requires only a few tens of instructions (see column B in FIG. 2). Tag length (avg. bits) is the average number of tag bits required when we adaptively encode tags by usage. Care fields is the average number of non-don't-care fields in used rules. Runtime overhead is the ratio of wall-clock runtime for the application running the policy compared to a baseline processor with no PUMP. There is some runtime overhead just for adding hardware structures for tags and PUMP, even if no policy is used. This overhead is captured in the first column (A) where all tags are default, there is a single rule, and the miss handler is effectively never invoked. Energy overhead is the ratio of energy for the application running the policy compared to a baseline processor with no PUMP. We show the energy both before the optimizations introduced in this paper (corresponding to [18]) and after).

4. Tag Compression

The key energy expense in the PUMP rule cache is proportional to both the number of rules and the number of tag bits that are inputs and outputs to the rule. A policy with fewer tags and rules, running on architecture with fewer tag bits and a PUMP rule cache with fewer entries will require less energy (See Table 1).

TABLE 1

| PUMP Organization | bits, rule entries | | | | | | |
|---|---|---|---|---|---|---|---|
| | 2 b, 16 | 3 b, 32 | 4 b, 32 | 5 b, 64 | 6 b, 64 | 8 b, 256 | 10 b, 1024 |
| Energy (pJ) | 0.16 | 0.29 | 0.33 | 0.54 | 0.61 | 1.8 | 5.5 |

Our key idea is to allow variable length tags and support smaller PUMP rule caches. In addition to using narrower tags when the total number of tags in the policy is small, we also allow the tags within a single policy to vary in length. This allows the most commonly used tags to be short, consuming less energy, while the infrequently used tags can have longer encodings. In practice, tag usage is very localized.

Figure 3:
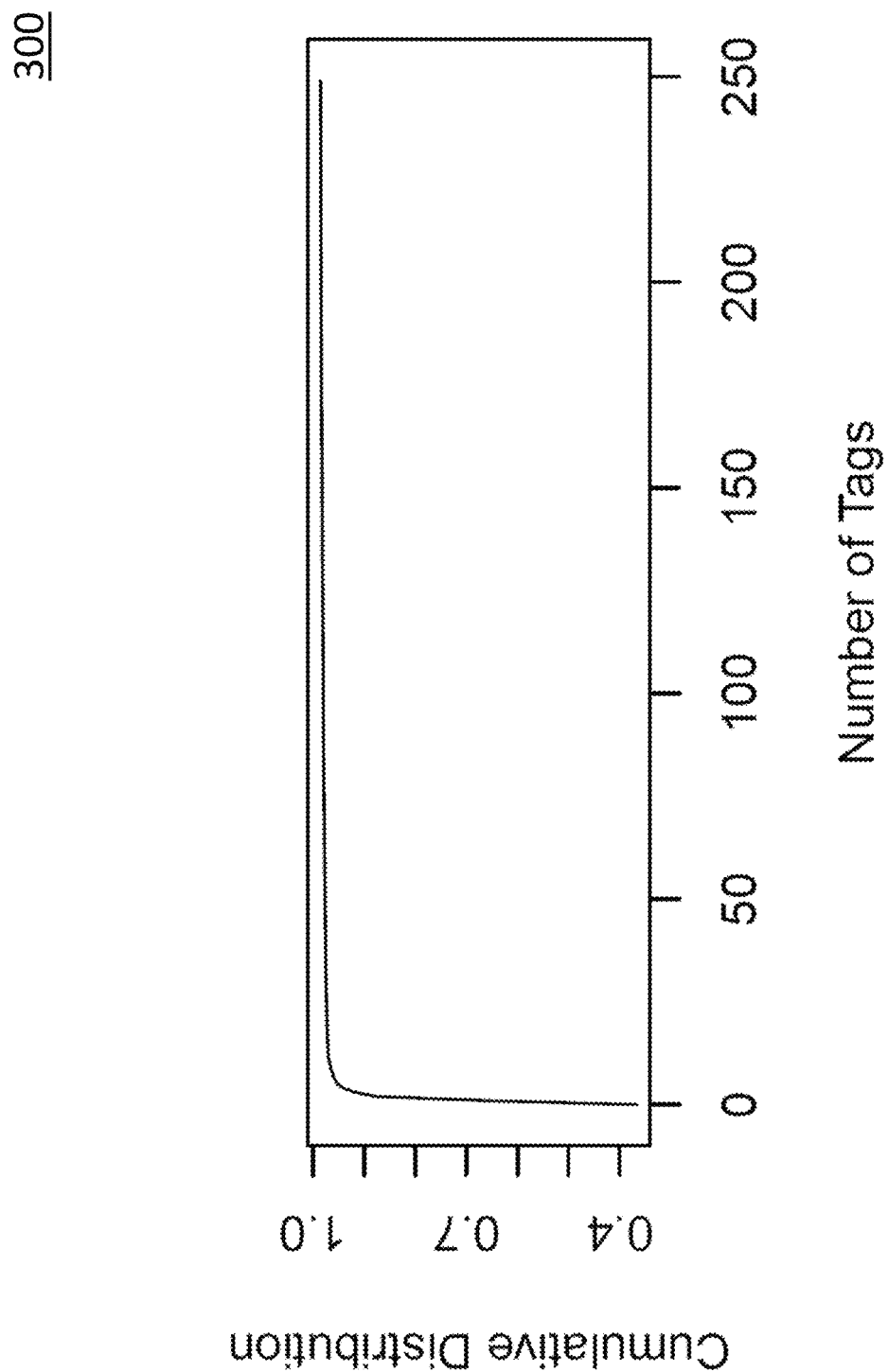
FIG. 3 is a diagram illustrating a cumulative distribution associated with different number of tags.

FIG. 3 illustrates a diagram 300 depicting the cumulative distribution function (CDF) for tags used in composite policy W for the gcc benchmark. This shows that the most used 7 tags correspond to 50% of the tags used, and the most used 25 tags correspond to 95% of the tags, suggesting there is significant opportunity to compress the tags even for a complex policy with over 0.25 million tags. The entropy of these tags is 3.8, and the average tag length with Huffman encoding is 4.2, much smaller than the 18b required in an equal-length tag assignment or even the 12b short tags used at the L1 cache level in [18].

Furthermore, the most common rules have short tag inputs. For example, a CDF for the maximum length of the tag in concrete rules used in composite policy W for the gcc benchmark may indicate that 50% of the concrete rules resolved have 3 or fewer tag bits in each care field and 90% have 7 or fewer bits. This suggests we can build smaller PUMPs to serve the shorter tags (Table 1) and satisfy most of our rule resolutions in these small PUMPs.

5. Selective Activation

Figure 4:
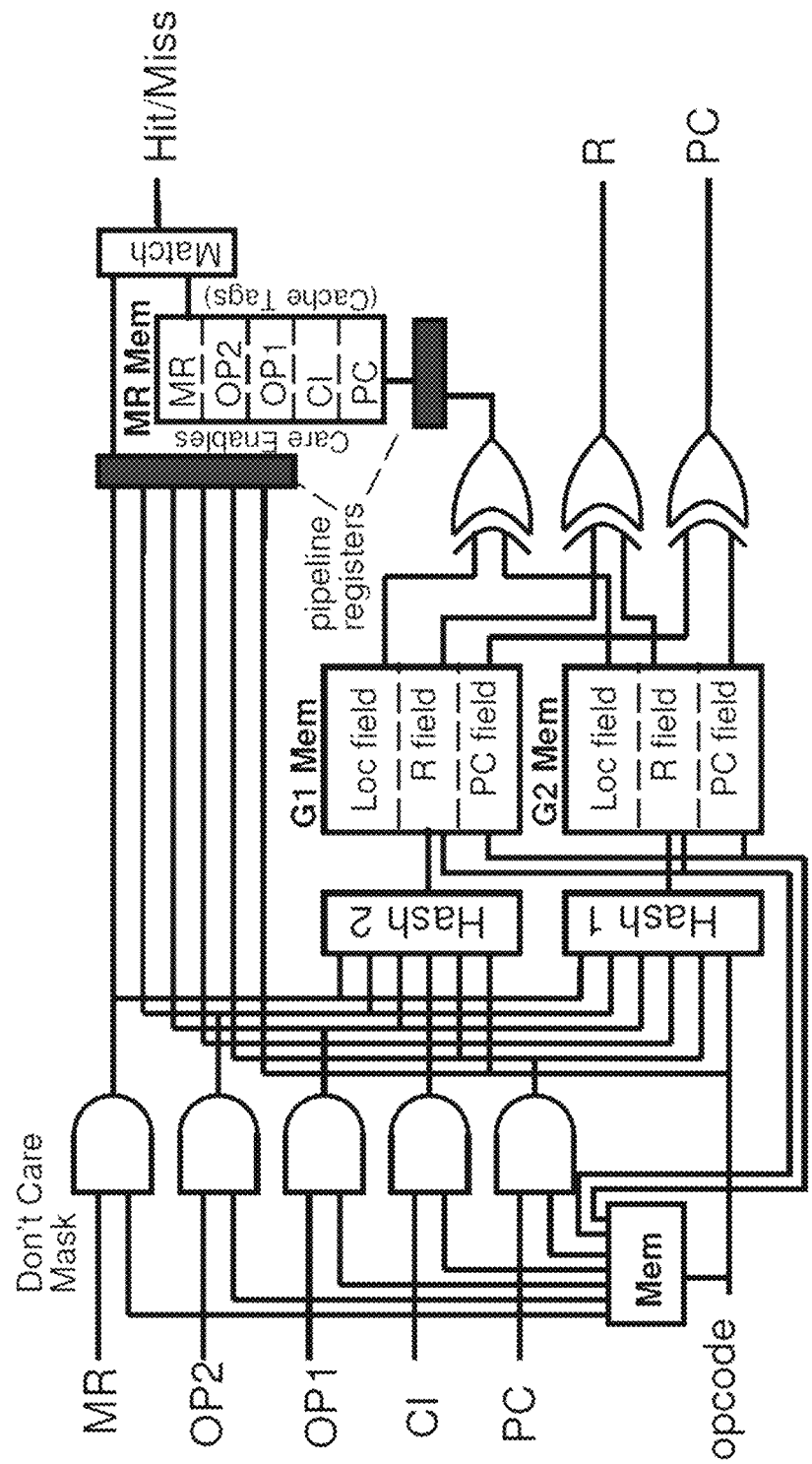
FIG. 4 is a diagram illustrating an example PUMP Microarchitecture with selective field activation.

FIG. 4 is a diagram illustrating an example PUMP Microarchitecture 400 with selective field activation. We can also reduce the number of inputs and outputs from the PUMP by observing that most rules have some don't-care bits and there is no need to activate the PUMP memories associated with the don't-care input and output fields (see FIG. 4). An example probability distribution function (PDF) for the number of input and output care bits used by concrete rules in the composite policy W for the gcc benchmark may illustrate that, even in the composite policy, few rules use all fields. The average number of input fields used is 3.2 and the average number of output fields is 1.1. Table 2 shows how energy varies with the used fields for a 6-bit PUMP with 64 entries.

TABLE 2

| output care | input care | | | | | |
|---|---|---|---|---|---|---|
| | 0 | 1 | 2 | 3 | 4 | 5 |
| 0 | 0.30 | 0.32 | 0.34 | 0.36 | 0.38 | 0.40 |
| 1 | 0.43 | 0.45 | 0.47 | 0.49 | 0.51 | 0.53 |
| 2 | 0.56 | 0.58 | 0.60 | 0.62 | 0.64 | 0.66 |

6. Main Memory

Energy is also spent moving tag bits to and from off-chip main memory. [18] showed that 90% of 512b (8, 64b words) cache-lines are tagged homogeneously. Nonetheless, they still transferred an entire 60b tag for each single tag cache line along with 32b of tag index. This means a minimum overhead of 18% for these common data transfers. They did not exploit tag compression. We note that the many policies use fewer than 214 tags, and even those that use more, have non-uniform tag usage, suggesting common tags can be made suitably short. To match a 2-byte DRAM granularity, we use the first 2b of the first 2 bytes to distinguish three common short-tag cases from the general case. For the shortest case, the remaining 14b encode the tag. We find 95% of the dynamic accesses to main memory for cache lines in gcc running composite policy W can be encoded with a single 14b tag, so we only need to transfer 2 bytes of metadata, or an overhead of only 3%. The other two short cases are the single tag 30b tag, which can be encoded in 4 bytes and the single tag 60b tag case that can be encoded in 8. For gcc policy W, this gets the average tag length communicated to/from main memory down to 3.1 bytes.

7. Microarchitecture for Tag Compression

Figure 5:
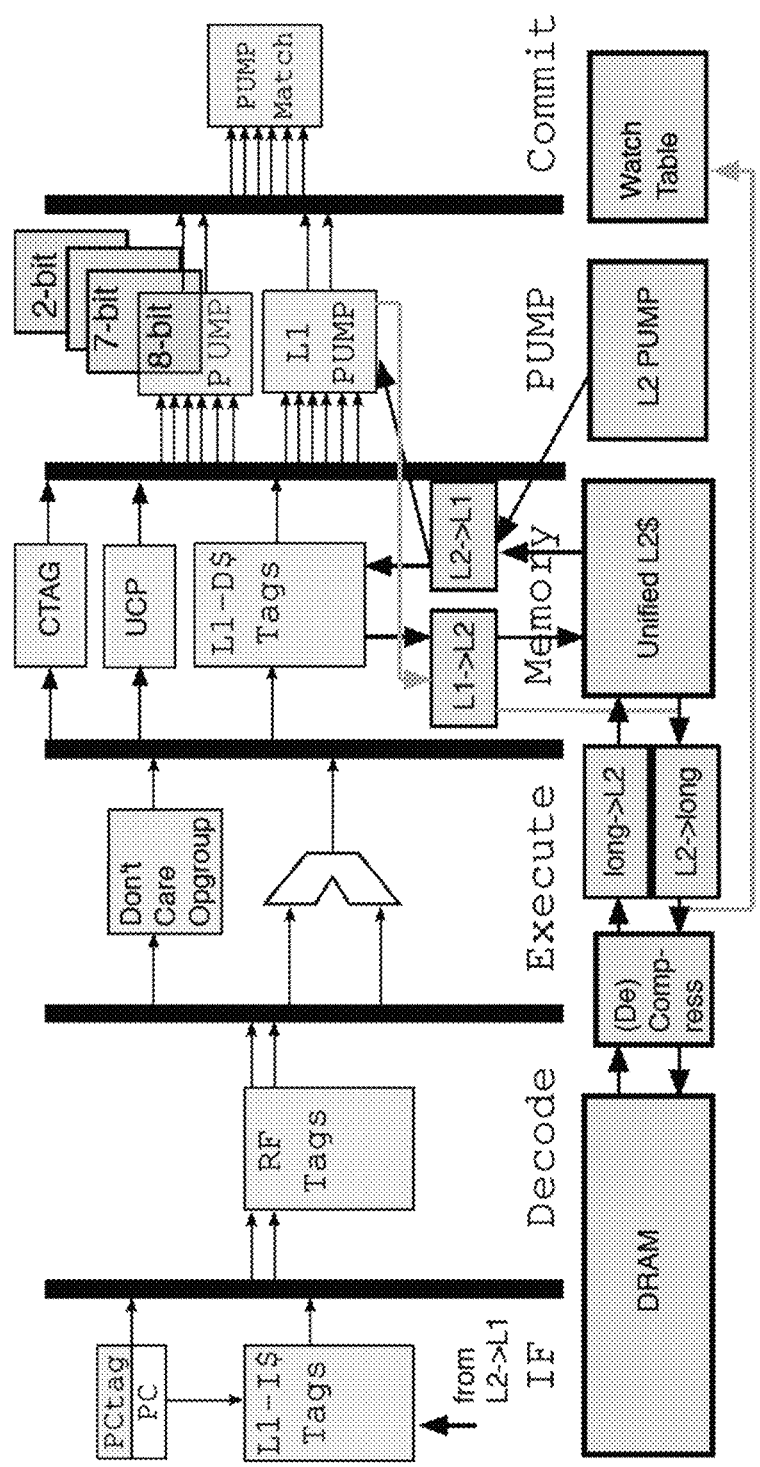
FIG. 5 is a diagram illustrating an example PUMP Microarchitecture with Bit PUMPs and a Watch Table.

To support and exploit energy proportionality and tag compression, we add smaller PUMPs, rule counters, and a Watch Table to keep track of usage counts on the most frequently used tags (FIG. 5). FIG. 5 depicts an example PUMP Microarchitecture 500 with Bit PUMPs and a Watch Table. In this example, PUMP Microarchitecture 500 provides different sized Bit PUMPs to support energy proportionality, where the smallest PUMP needed is energized for tag resolution so as to expend the least energy and where a watch table is used to store usage counts.

Bit PUMPs.

We add n-bit wide PUMP rule caches with $2 \leq n \leq 8$, the Bit PUMPs, in parallel with the L1 PUMP rule cache (FIG. 5). During the Memory Stage, the pipeline computes a maximum of the length of the tags associated with the rule. Based on this maximum size, the tag resolution is directed to exactly one of the Bit PUMPs or the L1 PUMP. This way we energize the smallest PUMP that can resolve the rule to expend the least energy. When a Bit PUMP misses, the pipeline stalls and the rule is resolved in the PUMP hierarchy starting with the L1 PUMP, and the rule is inserted into the appropriate Bit PUMP.

To track tag usage, each rule has an associated counter while it lives in the Bit PUMPs and L1 PUMP. The counter is incremented on each rule use, and travels with the rule as it moves between the Bit PUMPs and L1 PUMP. When the counter overflows or the rule is evicted from the L1 PUMP, the counter is optionally moved to the watch table, crediting the count to every watched tag in the rule that is in the watch table.

Watch Table.

The Watch Table is a limited-size associative memory that holds the total usage count of the top k tags. The watch table stores the full-length, 64b, tag and its usage count estimate. When there is space in the watch table, and a rule count exceeds a specified threshold (Sec. 8), the tags for the rule are translated back to 64b tags and the count for the rule is inserted or updated in the watch table for each of the tags in the rule.

L1 Tag Encoding.

The L1 level of the PUMP architecture (PC, Register File, L1 I-cache, L1 D-cache, L1 PUMP) holds both variable-length and fixed-length tags. The high bit in the tag indicates if the tag is a variable- or fixed-width encoding. For fixed-length tag, the remaining bits are the tag. For a variable-length tag, the next 3 bits encode the tag length, and the bottom bits are the actual tag value. This supports the Bit PUMP dispatch based on the maximum tag length for a rule.

Bit PUMP Sizing.

From an example CDF for rule usage for the Bit PUMPs, we may note that (a) no Bit PUMP needs more than 200 entries to hold 99% of PUMP references, and (b) the smaller Bit PUMPs (smaller n) need fewer entries than the larger Bit PUMPs. To minimize PUMP energy, we selected some capacities for the Bit PUMP (see Table 3). FIG. 6 shows some memory resource estimations for various implementations on a 22-nanometer node.

TABLE 3

| Architecture | Area (mm²) | Ratio Basline |
|---|---|---|
| Baseline | 0.79 | 1.0 |
| Tagged (10 b, 14 b) | 2.07 | 2.6 |
| Adaptive Tagged (bitpumps, 12 b, 15 b) | 2.38 | 3.0 |

8. Software Support

The tags used by a program and their usage pattern is, in general, data dependent and varies within the execution lifetime of an application. To minimize the energy spent on tags, we would like to adaptively compress tags close to their information content. At the same time, we must also contain the amount of time and energy we spend computing the tag encoding. As a compromise to keep encoding time small, while adapting tag encodings, we re-encode tags periodically at the granularity of epochs, fixed-sized counts of cycles that provide a logical chunking of a program's trace into sections. At the beginning of an epoch, the system is reset, and the Watch Table is cleared and rule counts of Bit PUMP and L1 entries are set to 0. During the epoch, tags can be inserted into the Watch List; this happens when a rule is evicted from the L1 PUMP. A tag is added only if the usage count on the source rule in the L1 PUMP at the time of eviction is equal to or greater than the current threshold value. Because tags are added from rules, more than one tag may be added to the Watch List from a single eviction. If a tag is already in the Watch List when it would be inserted, the count is added to the current count instead to maintain a running sum. The work to compute tags between epochs is determined only by the size to the Watch Table, so larger epochs will reduce the encoding overhead. On the other hand, as the epoch size increases, the amount of time we may be running with out of data statistics, and hence sub-optimal tag encodings increases. For a Watch Table with 256 entries, we find that encoding requires around 100,000 cycles, or 2% of time for a 5M cycle epoch.

For the Watch Table to provide a good approximation of the most frequently used tag set, the threshold value must be set appropriately. The threshold value serves as a measure of exclusivity over the limited size Watch Table. The larger the threshold the fewer evicted rules will make it into the Watch Table, and vice versa. The objective is to "catch" the highly used tags in the Watch Table and so the value of the threshold is important. If the threshold is too large, we won't fill up the watch table and miss the opportunity to give short encodings to some frequently used tags. A tag that is used many times in small bursts, being evicted from the PUMP caches between usage sets, may have many total uses, but never climb above the threshold such that its statistics are recorded. If the threshold is too small, the watch table may fill up before one of the high-usage tags is ever seen within the epoch. Since the rate of Watch Table filling is also data dependent, we employ a simple control loop to adapt the threshold between epochs based on how much of the Watch Table is left empty (threshold too high) or when the Watch Table filled up before the end of the epoch (threshold too low).

At the end of each epoch, the rules remaining in the Bit PUMPs and L1 PUMP are flushed into the Watch Table in the same fashion so that these counts are included in the Watch Table tag frequency counts. At this point, the tag statistics collection is complete, and a service routine is invoked to recompute tag encodings. The tag compression service routine uses the (tag, frequency) pairs from the Watch Table to compute the Huffman-coded [27] bit patterns for the captured tags. These encodings are installed into the long tag translation tables (FIG. 5) for use in the next epoch. By seeding the tag translation tables with these new tags, we guarantee the full tags are suitable translated to their compressed encodings. Once installed, the service routine returns execution to the application program. In this way, the system is always using the encoding from the previous epoch for the current epoch and preparing the encoding for the next epoch from current tag usage. This adaptivity allows the system to keep relevant encodings for highly used tags, a property that can change quickly as application runs (e.g., malloc creates new memory tags, control flow transitions between major phases and loops in the program).

Figure 7:
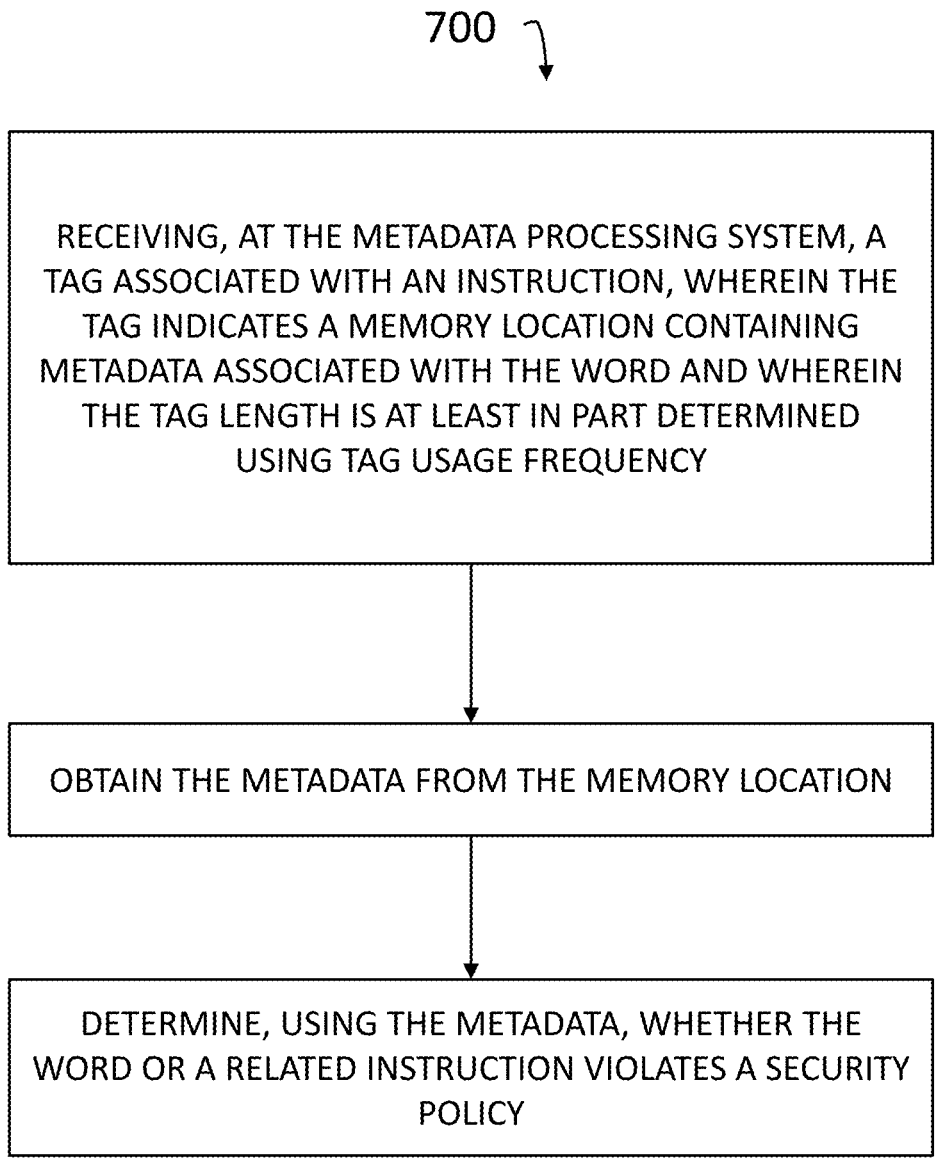
FIG. 7 is a flowchart illustrating an example method for using variable metadata tags.

FIG. 7 is a flowchart illustrating an example method 700 for using variable metadata tags. Method 700 or portions thereof can be performed, for example, by a metadata processing system or related elements for enforcing security policies in a processor architecture (e.g., RISC-V) implemented using one or more processors.

In some embodiments, an example metadata processing system can be software executing firmware and/or hardware, e.g., a processor, a microprocessor, a central processing unit, or a system on a chip. An example of a metadata processing system or aspects thereof are shown in FIGS. 4-5 and discussed in various sections herein. In some examples, a metadata processing system for enforcing security policies in a processor architecture may utilize a SDMP model and/or a PUMP system.

Method 700 includes receiving, at the metadata processing system, a tag associated with a word in memory, wherein the tag indicates a memory location containing metadata associated with the word and wherein the tag length is at least in part determined using tag usage frequency. In some examples, a data cache, an instruction cache, or a memory controller associated with a metadata processing system may receive and/or use metadata tags. In some examples, when using instruction or data caches in the metadata processing system, when tags are needed for an instruction or a word addressed by an instruction (e.g., a RISC-V instruction), these tags may be retrieved from the appropriate caches and presented to metadata processing system for processing to determine whether the associated instruction should be allowed (e.g., whether it meets the relevant security policies).

In some embodiments, tag usage frequency may be computed using rule counters and a watch table, wherein each rule counter may be incremented when an associated rule may be used and wherein the watch table indicates usage counts for a plurality of tags.

In some embodiments, a tag may be one of a plurality of tags generated based on usage frequency of the tag over a period of time.

In some embodiments, a plurality of tags may be variable in length and may be generated using a compression algorithm, wherein at least some frequently used tags may be shorter in length than some less frequently used tags.

In some embodiments, a compression algorithm may include Huffman encoding, adaptive Huffman encoding, or n-ary Huffman encoding.

Method 700 includes obtaining the metadata from the memory location. For example, the metadata processing system may read metadata stored in memory identified by a tag. In this example, the metadata may be one of five metadata inputs associated with an instruction.

In some embodiments, obtaining metadata from a memory location may include reading the metadata from off-chip memory.

Method 700 includes determining, using the metadata, whether the word or a related instruction violates a security policy. For example, the metadata processing system may consult or access one or more rule caches to determine whether a rule associated with the metadata is stored. In this example, if the rule is present, the metadata processing system may determine that the instruction satisfies a relevant security policy.

In some embodiments, determining, using the metadata, whether the word or a related instruction violates a security policy may include selecting a rule cache based on a maximum tag length from tags lengths of tags associated with the security policy and querying the rule cache to determine whether the instruction violates the security policy.

In some embodiments, a rule cache may be a n-bit rule cache, wherein n may be an integer greater than one and less than nine.

In some embodiments, a rule cache may store rules that use pointer-sized tags.

In some examples, method 700 can be executed in a distributed manner. For example, a plurality of processors may be configured for performing method 700 or portions thereof.

REFERENCES

The inline citations herein refer to the references listed below, and the disclosure of each of the following references is incorporated herein by reference in its entirety to the extent not inconsistent herewith and to the extent that it supplements, explains, provides a background for, or teaches methods, techniques, and/or systems employed herein.

[1] J. R. Crandall, F. T. Chong, and S. F. Wu, "Minos: Architectural support for protecting control data," ACM Transactions on Architecture and Code Optimization, vol. 5, pp. 359-389, December 2006.

[2] N. Vachharajani, M. J. Bridges, J. Chang, R. Rangan, G. Ottoni, J. A. Biome, G. A. Reis, M. Vachharajani, and D. I. August, "RIFLE: An architectural framework for user-centric information-flow security," in 37th International Symposium on Microarchitecture, 2004.

[3] S. Chen, J. Xu, N. Nakka, Z. Kalbarczyk, and R. Iyer, "Defeating memory corruption attacks via pointer taintedness detection," in International Conference on Dependable Systems and Networks (DSN), pp. 378-387, 2005.

[4] J. A. Clause, W. Li, and A. Orso, "Dytan: a generic dynamic taint analysis framework," in ACM/SIGSOFT International Symposium on Software Testing and Analysis (ISSTA), pp. 196-206, ACM, 2007.

[5] M. G. Kang, S. McCement, P. Poosankam, and D. Song, "DTA++: Dynamic taint analysis with targeted control-flow propagation," in Network and Distributed System Security Symposium (NDSS), The Internet Society, 2011.

[6] Y.-Y. Chen, P. A. Jamkhedkar, and R. B. Lee, "A software-hardware architecture for self-protecting data," in ACM Conference on Computer and Communications Security, pp. 14-27, ACM, 2012.

[7] G. E. Suh, J. W. Lee, D. Zhang, and S. Devadas, "Secure program execution via dynamic information flow tracking," in International Conference on Architectural Support for Programming Languages and Operating Systems, pp. 85-96, 2004.

[8] G. Venkataramani, B. Roemer, Y. Solihin, and M. Prvulovic, "Memtracker: Efficient and programmable support for memory access monitoring and debugging," in Proceedings of the International Symposium on High Performance Computer Architecture, pp. 273-284, 2007.

[9] M. Abadi, M. Budiu, Ú. Erlingsson, and J. Ligatti, "Control-flow integrity principles, implementations, and applications," ACM Transactions on Information System Security, vol. 13, no. 1, 2009.

[10] N. P. Carter, S. W. Keckler, and W. J. Daily, "Hardware support for fast capability-based addressing," in Proceedings of the international conference on Architectural support for programming languages and operating systems, ASPLOS-VI, pp. 319-327, 1994.

[11] P. Akritidis, M. Costa, M. Castro, and S. Hand, "Baggy bounds checking: an efficient and backwards-compatible defense against out-of-bounds errors," in Proceedings of the 18th Conference on USENIX Security Symposium, pp. 51-66, 2009.

[12] S. Nagarakatte, M. M. K. Martin, and S. Zdancewic, "Hardware-Enforced Comprehensive Memory Safety," IEEE Micro, vol. 33, pp. 38-47, May-June 2013.

[13] K. Ganesh, "Pointer checker: Easily catch out-of-bounds memory access," The Parallel Universe, 2012.

[14] C. Zhang, T. Wei, Z. Chen, L. Duan, L. Szekeres, S. McCamant, D. Song, and W. Zou, "Practical Control Flow Integrity & Randomization for Binary Executables," in IEEE Symposium on Security and Privacy, 2013.

[15] R. Prakash, "The holy grail—real time memory access checking." Online https://blogs.oracle.com/raj/entry/the-_holy_grail_real_time, October 2015.

[16] E. Göktaş, E. Athanasopoulos, H. Bos, and G. Portokalidis, "Out of control: Overcoming control-flow integrity," in IEEE Symposium on Security and Privacy, 2014.

[17] L. Davi, A. Sadeghi, D. Lehmann, and F. Monrose, "Stitching the gadgets: On the ineffectiveness of coarse-grained control-flow integrity protection," in 23rd USENIX Security Symposium, pp. 401-416, 2014.

[18] U. Dhawan, C. Hriţcu, R. Rubin, N. Vasilakis, S. Chiricescu, J. M. Smith, T. F. Knight, Jr., B. C. Pierce, and A. DeHon, "Architectural support for software-defined metadata processing," in International Conference on Architectural Support for Programming Languages and Operating Systems, pp. 487-502, 2015.

[19] I. Heo, M. Kim, Y. Lee, J. Lee, B. B. Kang, and Y. Paek, "Implementing an application specific instruction-set processor for system level dynamic program analysis engines," ACM Transactions on Design Automation of Electronic Systems, vol. 9, p. Article 39, March 2015.

[20] S. Fytraki, E. Vlachos, Y. O. Koçberber, B. Falsafi, and B. Grot, "FADE: A programmable filtering accelerator for instruction-grain monitoring," in 20th IEEE International Symposium on High Performance Computer Architecture, HPCA 2014, Orlando, Fla., USA, Feb. 15-19, 2014, pp. 108-119, 2014.

[21] S. Nagarakatte, J. Zhao, M. M. K. Martin, and S. Zdancewic, "SoftBound: highly compatible and complete spatial memory safety for C," in ACM SIGPLAN Conference on Programming Language Design and Implementation (PLDI), pp. 245-258, ACM, 2009.

[22] D. Arora, S. Ravi, A. Raghunathan, and N. K. Jha, "Architectural support for run-time validation of program data properties," IEEE Transactions on Very Large Scale Integration (VLSI) Systems, vol. 15, pp. 546-559, May 2007.

[23] S. Chen, M. Kozuch, T. Strigkos, B. Falsafi, P. B. Gibbons, T. C. Mowry, V. Ramachandran, O. Ruwase, M.

P. Ryan, and E. Vlachos, "Flexible hardware acceleration for instruction-grain program monitoring," in 35th International Symposium on Computer Architecture (ISCA), pp. 377-388, IEEE, 2008.

[24] J. A. Clause, I. Doudalis, A. Orso, and M. Prvulovic, "Effective memory protection using dynamic tainting," in 22nd IEEE/ACM International Conference on Automated Software Engineering (ASE), pp. 284-292, ACM, 2007.

[25] R. Wahbe, S. Lucco, T. E. Anderson, and S. L. Graham, "Efficient software-based fault isolation," in Proceedings of the Symposium on Operating Systems Principles, SOSP, pp. 203-216, 1993.

[26] M. Abadi, M. Budiu, Ú. Erlingsson, and J. Ligatti, "Control-flow integrity," in 12th ACM Conference on Computer and Communications Security, pp. 340-353, ACM, 2005.

[27] D. A. Huffman, "A method for the construction of minimum redundancy codes," Proceedings of the IRE, vol. 40, pp. 1098-1101, 1952.

Although specific examples and features have been described above, these examples and features are not intended to limit the scope of the present disclosure, even where only a single example is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed in this specification (either explicitly or implicitly), or any generalization of features disclosed, whether or not such features or generalizations mitigate any or all of the problems described in this specification. Accordingly, new claims may be formulated during prosecution of this application (or an application claiming priority to this application) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A method for using variable metadata tags, the method comprising:
   at a metadata processing system for enforcing security policies in a processor architecture:
      receiving, at the metadata processing system, a tag associated with a word in memory, wherein the tag indicates a memory location containing metadata associated with the word and wherein the tag length is at least in part determined using tag usage frequency;
      obtaining the metadata from the memory location, and
      determining, using the metadata, whether the word or a related instruction violates a security policy.

2. The method of claim 1, wherein tag usage frequency is computed using rule counters and a watch table, wherein each rule counter is incremented when an associated rule is used and wherein the watch table indicates usage counts for a plurality of tags.

3. The method of claim 1, wherein the tag is one of a plurality of tags generated based on usage frequency of the tag over a period of time.

4. The method of claim 3, wherein the plurality of tags are variable in length and are generated using a compression algorithm, wherein at least some frequently used tags are shorter in length than some less frequently used tags.

5. The method of claim 4, wherein the compression algorithm includes Huffman encoding, adaptive Huffman encoding, or n-ary Huffman encoding.

6. The method of claim 1, wherein determining, using the metadata, whether the word or a related instruction violates a security policy includes selecting a rule cache based on a maximum tag length from tags lengths of tags associated with the security policy and querying the rule cache to determine whether the instruction violates the security policy.

7. The method of claim 6, wherein the rule cache is a n-bit rule cache, wherein n is an integer greater than one and less than nine.

8. The method of claim 6, wherein the rule cache stores rules that use pointer-sized tags.

9. The method of claim 1, wherein obtaining the metadata from the memory location includes reading the metadata from off-chip memory.

10. A system for using variable metadata tags, the system comprising:
    one or more processors; and
    a metadata processing system for enforcing security policies in a processor architecture implemented using the one or more processors and configured to perform operations comprising:
       receiving, at the metadata processing system, a tag associated with a word in memory, wherein the tag indicates a memory location containing metadata associated with the word and wherein the tag length is at least in part determined using tag usage frequency;
       obtaining the metadata from the memory location, and
       determining, using the metadata, whether the word or a related instruction violates a security policy.

11. The system of claim 10, wherein tag usage frequency is computed using rule counters and a watch table, wherein each rule counter is incremented when an associated rule is used and wherein the watch table indicates usage counts for a plurality of tags.

12. The system of claim 10, wherein the tag is one of a plurality of tags generated based on usage frequency of the tag over a period of time.

13. The system of claim 12, wherein the plurality of tags are variable in length and are generated using a compression algorithm, wherein at least some frequently used tags are shorter in length than some less frequently used tags.

14. The system of claim 13, wherein the compression algorithm includes Huffman encoding, adaptive Huffman encoding, or n-ary Huffman encoding.

15. The system of claim 10, wherein the metadata processing system is configured for selecting a rule cache based on a maximum tag length from tags lengths of tags associated with the security policy and querying the rule cache to determine whether the instruction violates the security policy.

16. The system of claim 15, wherein the rule cache is a n-bit rule cache, wherein n is an integer greater than one and less than nine.

17. The system of claim 15, wherein the rule cache stores rules that use pointer-sized tags.

18. The system of claim 10, wherein the metadata processing system is configured for reading the metadata from off-chip memory.

19. A non-transitory computer readable medium storing executable instructions that when executed by at least one processor of a computer control the computer to perform operations comprising:
    at a metadata processing system for enforcing security policies in a processor architecture:
        receiving, at the metadata processing system, a tag associated with a word in memory, wherein the tag indicates a memory location containing metadata associated with the word and wherein the tag length is at least in part determined using tag usage frequency;
        obtaining the metadata from the memory location, and
        determining, using the metadata, whether the word or a related instruction violates a security policy.

\* \* \* \* \*